Nov. 10, 1964  M. G. DREXHAGE  3,156,040
METAL FABRICATION
Filed Nov. 8, 1960
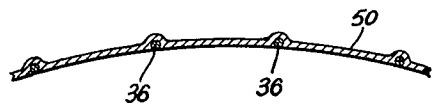
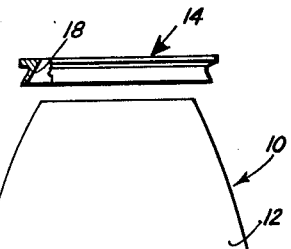
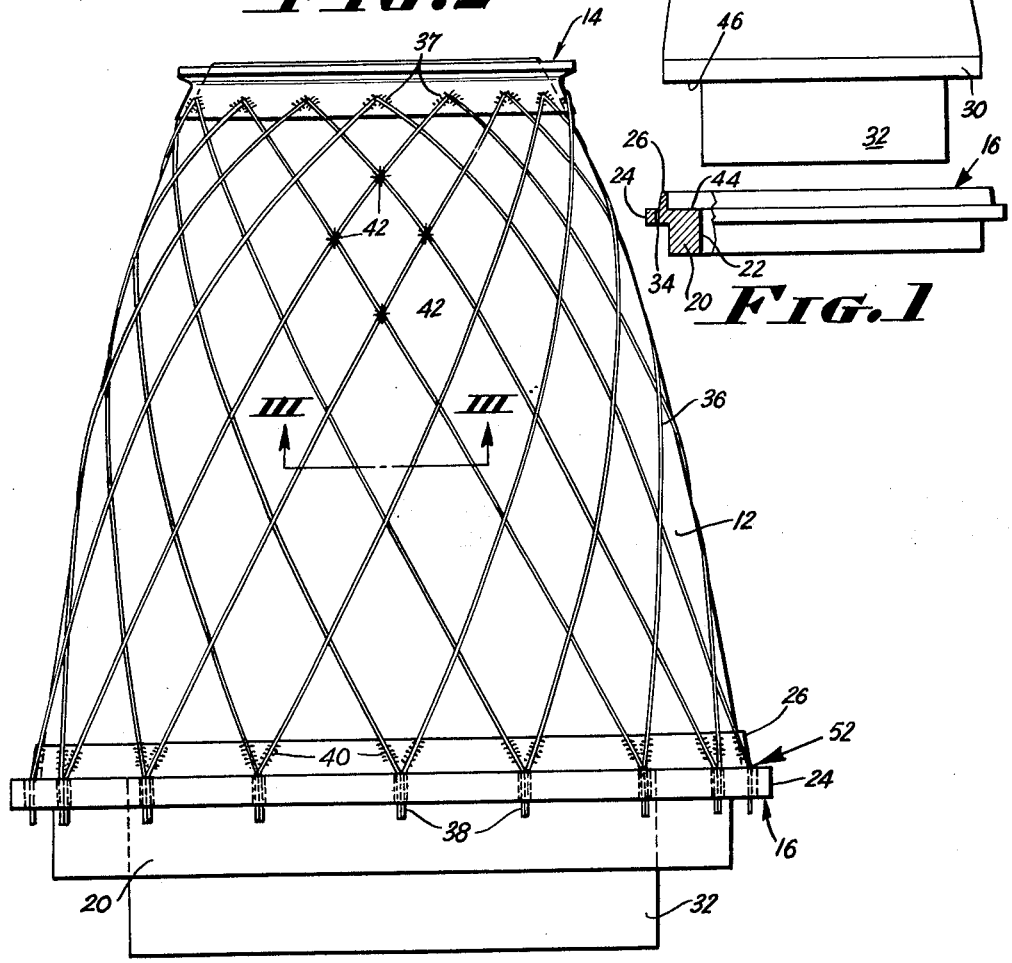
INVENTOR.
MARTIN G. DREXHAGE
BY:
Beau, Brooks, Buckley & Beau,
ATTORNEYS.

3,156,040
METAL FABRICATION

Martin G. Drexhage, Buffalo, N.Y., assignor to Bell
Aerospace Corporation, Wheatfield, N.Y.
Filed Nov. 8, 1960, Ser. No. 68,018
2 Claims. (Cl. 29—452)

This invention relates to the art of metal fabrication and more particularly relates to the fabrication of articles having a space frame of relatively high tensile strength which is embedded in and covered by a skin of relatively low tensile but high compressive strength, the skin being applied to the frame in the form of a metal spray.

At the present time, particularly in such fields as rocketry, many parts are required to be fabricated from refractory metals, such as molybdenum, which due to their lack of ductility and difficulty in welding are difficult to construct with conventional sheet metal techniques. This is particularly true when the article in question is of singular shape or which, though regular in shape, may require surface portions having compound curvature. It is therefore a primary object of this invention to provide means whereby articles which are difficult to fabricate by conventional sheet metal techniques may be constructed in the form of a high tensile strength frame provided with a skin of low tensile strength intimately joined thereto by applying the skin in the fashion of a metal spray.

Another object of this invention resides in the concept of metal fabrication wherein articles otherwise difficult or impractical to fabricate are built up from a basic framework of open form and constructed of high tensile strength material so as to predominantly provide for the load-carrying capacity of the article, the voids of the framework being covered with a skin of relatively low tensile strength material applied as a metal spray and being intimately joined with the framework.

A further object of this invention is to fabricate articles otherwise difficult or impractical to construct by means of first building up a prestressed, open framework of relatively high tensile strength and then covering the framework, while stressed, with a surface-forming skin of low tensile strength material in the form of a metal spray.

Another object of this invention resides in the utilization of a mandrel having a pair of collars associated therewith and between which a criss-cross framework of relatively high tensile strength wires is built up with each wire being joined at its opposite ends to the collars with the intermediate portions of the wires laying on the surface of the mandrel, whereafter, a metal spray is utilized to build up, on the surface of the mandrel and with the wires embedded therein, a skin which is of requisite thickness and of relatively low tensile strength.

A further object of this invention resides in the concept in conformity with the preceding object wherein the framework is subjected to tensile stress during the formation of the skin, which stress is subsequently released to place the low tensile strength material in compression and wherein the stressing of the wires during application of the skin is sufficient to maintain the material of the skin under compression through the entire range of operating loads on the article so produced.

Other objects and advantages of the present invention will appear from the description hereinbelow and the accompanying drawings wherein:

FIG. 1 is an exploded elevation, partly in section, showing a mandrel and associated rings or collars used in the fabrication of articles in accordance with this invention;

FIG. 2 is an elevation view of the mandrel assembled with the collars and showing the high tensile strength wire framework as built up over the surface of the mandrel and between the rings or collars; and FIG. 3 is an enlarged section taken through a portion of the completed article, showing the manner in which the high tensile strength frame is embedded in the low tensile strength skin.

Referring at this time more particularly to FIG. 1 wherein the basic component parts for practicing this invention are shown, it is to be understood that the mandrel 10, although shown as having one particular type of outer surface 12, may be of various shapes or forms, dependent upon the ultimate configuration of the article being made. In the particular example shown, however, the finished article is roughly of frusto-conical shape but with compound curvature.

Associated with the mandrel are upper and lower rings or collars 14 and 16, the former of which has its inner surface 18 so shaped as to seat squarely upon the mandrel 10 in the position as is shown in FIG. 2. The lower collar 16 is provided with a hub portion 20 having a circular bore 22 therethrough and also includes a radially projecting flange 24 and an upstanding skirt 26 having a cylindrical inner surface 28 which engages the cylindrical flat 30 at the base of the mandrel 10. The mandrel includes a stem 32 which receives the bore 22 in the lower collar 16 when the latter is in proper position as in FIG. 2.

The flange 24 of the lower collar 16 is provided with a series of circumferentially spaced openings 34, the purpose of which will be presently apparent. When the two collars 14 and 16 are properly positioned on the mandrel 10, a plurality of high tensile strength wires 36 are passed between the upper and lower collars substantially as is shown in FIG. 2. These high tensile strength wires 36 are first spot welded or otherwise secured as for example by mechanical means at 37, to the upper collar 14 and they are stretched over the curved surface of the mandrel with the angularly offset ends 38 thereof passed through the openings 34 in the flange 24 of the lower collar 16. It will be noted that the angularly offset ends 38 of the wires are of sufficient length to project a substantial distance below the flange 24. These ends are grasped by any suitable means, not shown, and pulled downwardly to prestress all of the wires simultaneously and while in the prestressed state, the wires are spot welded or otherwise suitably attached as at 40 to the skirt 26 substantially as is shown. The wires are also spot welded at their intersections as at 42. Thus, the wires lay as geodesic lines between their end points with all the wires forming a geodesic network on the compound curvature surface 12 of the mandrel. Since the upper collar 14 seats at the upper end of the mandrel and the annular flat face 44 of the lower collar 16 abuts against the surface 46 of the mandrel, see FIG. 1, after the wires are all suitably attached, the prestressing force may be released and the mandrel itself will maintain the wires in the prestressed state.

The prestressed wire structure on the mandrel, preferably while being rotated, is then covered with a skin 50, see particularly FIG. 3, applied as by the flame spraying process and this skin covers and embeds the wires 36 as shown and is also extended to cover the collars 14 and 16. The lower collar 16 is then severed at the intersection by the skirt 26 and the flange 24 as indicated at 52 in FIG. 2. This releases the prestressed wire framework and the skin for ultimate removal from the mandrel.

Thus, the upper collar 14 becomes a part of the structural member and the skirt 26 of the lower collar 16 forms a part of the structural member and each may be used for attaching the article in place in the environment in which it is used. As a specific example of the use of this invention, the particular article shown is a non-cooled rocket nozzle extension and is made from molybdenum. This metal, which has high temperature strength and good refractory characteristics, is particularly difficult to form by conventional techniques. The wires 36 are high tensile strength wires and the skin 50 is of relatively low tensile strength. However, the prestressing of the wires 36 is effected to sufficient magnitude that the relatively low tensile strength skin 50 will remain in compression throughout the entire range of operating loads of the structure. Shock loads introduced through the end members 14 and 26 are predominantly carried by the high strength wires. As the mandrel 10 is made from aluminum, the stretched article is easily removed therefrom by cooling the assembly since the aluminum has a much higher terminal coefficient of expansion than does the molybdenum.

I claim:

1. The method of fabricating metal articles particularly from metals of low ductility, which comprises placing a pair of rings on opposite end portions of a mandrel having an intermediate portion of compound curvature dimensioned to pass neither of said rings, and with said rings spaced apart by said intermediate portion of the mandrel, attaching the ends of a series of high tensile strength wires to one of said rings at circumferentially spaced points thereof and passing such wires therefrom over said intermediate portion of the mandrel to lie as a geodesic network thereon between the rings, prestressing said wires and attaching them, while prestressed, to the other of said rings, spraying a metal skin over said intermediate portion of said mandrel and said rings to form a shell having said wires embedded therein, cutting away the inside of one of said rings at its abutment surface with the mandrel to permit such ring to pass over said intermediate portion of the mandrel, thereby releasing the prestressing force upon the wires and effecting compression of said skin, and then removing the article from the mandrel.

2. The method according to claim 1 wherein said wires are of high tensile strength molybdenum and said skin is of relatively low tensile strength molybdenum.

References Cited by the Examiner
UNITED STATES PATENTS

| | | | |
|---|---|---|---|
| 664,438 | 12/00 | Sargent | 29—191.4 |
| 1,815,187 | 7/31 | Coles | 29—191.4 |
| 2,335,038 | 11/43 | Bridges. | |
| 2,413,990 | 1/47 | Muntz. | |
| 2,510,857 | 6/50 | Bihlman | 29—527 |
| 2,912,751 | 11/59 | Turnbull | 29—527 |
| 2,944,338 | 7/60 | Craig | 29—527 XR |
| 3,136,036 | 6/64 | Dobell | 29—452 XR |

JOHN F. CAMPBELL, *Primary Examiner.*

WHITMORE A. WILTZ, HYLAND BIZOT,
*Examiners.*